April 3, 1951  H. A. THOMSON  2,547,421
STUD FASTENING
Filed Sept. 28, 1949
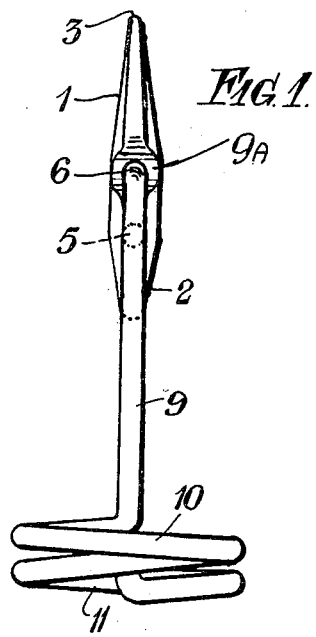
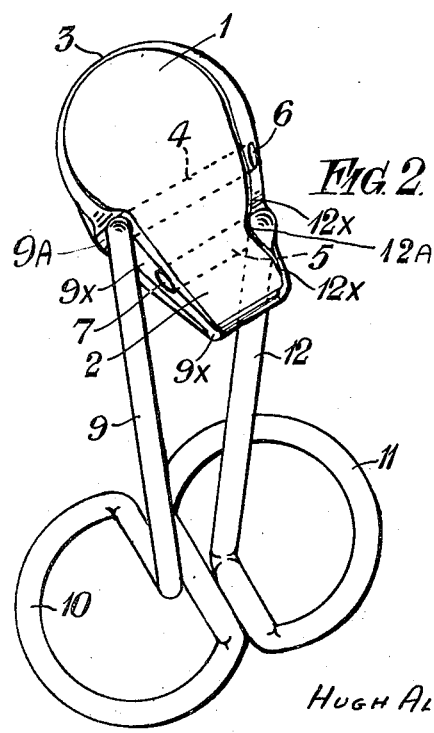
INVENTOR:
HUGH ALEXANDER THOMSON
BY:
Haseltine, Lake & Co.
AGENTS

UNITED STATES PATENT OFFICE 2,547,421

STUD FASTENING

Hugh Alexander Thomson, London, England

Application September 28, 1949, Serial No. 118,393
In Great Britain October 1, 1948

2 Claims. (Cl. 24—97)

This invention relates to stud fastenings and is more particularly concerned with the problem of providing a simply constructed stud fastening which will be satisfactory in use as a collar stud.

In accordance with the invention there is provided a stud fastening comprising a head portion, a first pivot entered in said head portion, a second pivot entered in said head portion in spaced relation from said first pivot, two stems respectively connected with said first and second pivots and an elastically deformable base portion to which both stems are connected.

In accordance with a different aspect of the invention there is provided, a stud fastening comprising a head portion, a first pivot disposed in said head portion, a second pivot disposed in said head portion in spaced relation from said first pivot, a first extension from one end of said first pivot, a second extension from the oppositely placed end of said second pivot said extensions constituting the stem of the stud, and a base portion constituted by an elastically deformable connection extending between the free extremities of said extensions.

For a better understanding of the nature of the invention and to show how the same may be carried into effect reference will now be made to the accompanying drawings in which:

Figure 1 is a side view of a stud fastening primarily for use as a collar-stud, and Figure 2 is a perspective view corresponding to Figure 1 but with the stud in a different operative position.

The head of the stud 1 is generally of tapered shape having a tail portion 2. The main head portion 1 has a curved end 3 which in thickness tapers towards the edge 3. There are two internal holes 4 and 5 formed in the head portion of the stud, the hole 5 being located in the tail part while the hole 4 is more nearly located in the main part of the head portion. The holes 4 and 5 are substantially parallel and serve to accommodate cranked end pieces 6 and 7 of one continuous wire. The end piece 6 is integral with a stem portion 9 of the wire, such stem portion being bent to form a convolution 10 located in a plane that is almost perpendicular to the stem 9. The convolution 10 is continued into a further convolution 11 from which the wire is bent to form a second stem portion 12 integral with the previously mentioned end portion 7. It will be realized that the single piece of wire constitutes a pivot 6 for the stud head, a stem 9, a base frame 10 and 11, a further stem 12, and finally a second pivot 7 for the head.

In Figure 2 the stud is shown with the head lying in a plane substantially parallel to the base of the stud constituted by the two convolutions 10 and 11. This is of course the position of the stud in which it is normally employed after insertion in stud holes. The two convolutions 10 and 11 are substantially co-planar and the two stems 9 and 12 take up minimum space in the stud hole thereby ensuring that the collar is held correctly together without gaping. It will be appreciated that the head of the stud can be moved so as to carry the tail 2 towards a location where it lies between the stems 9 and 12. In so doing the stem 9 must rise relatively to the stem 12 because the axes of the pivots 6 and 7 are not co-incident. Thus movement of the stud head from the position where it lies parallel to the base of the stud will be resiliently resisted. Such resistance can be manually overcome to permit the stud head to be brought to the position shown in Figure 1 where the edge 3 is uppermost. In bringing the stud head to the position shown in Figure 1, the stem 9 will have been raised relatively to the stem 12 to an extent such that the convolutions 10 and 11 associated respectively with these stems will no longer be co-planar. This is apparent from Figure 1. The stud will be stable in the position shown in Figure 1 for the reason that the tail piece 2 will be thrust against the stem 12 because the stem 9 will be tending to turn the stud head in the plane thereof and will thereby be pressing the tail 2 tightly against the stem 12. The tail 2 is grooved on both edges at 9X and 12X into which grooves the stems 9 and 12 are pressed to ensure that contact therewith is stably maintained. The sides of the stud head also have cavities 9A and 12A which are engaged by the stems 9 and 12 when the stud head is in the position shown in Figure 2.

In using the stud, it is preferably brought first to the position shown in Figure 1 where the head can be easily passed through the stud hole. Once the stud is in position the head can be swung to the location shown in Figure 2, the movement being assisted by the energy stored in the convolutions 10 and 11 of the base, such convolutions returning from their distorted situation to that where they lie substantially co-planar.

It is possible to simplify the above described construction by employing one hole instead of the two holes 6 and 7. This would mean that the pivots would be in line. The stud head when in the position shown in Figure 1 would then be held simply by the lateral spring pressure of the two stems 9 and 12 gripping in the grooves 9X and 12X, while in the position shown in Figure 2 the head would be located by a cavity at either side equivalent to the cavities 9A and 12A when aligned.

It will be further appreciated that with the construction actually illustrated in the drawings the two pivots 6 and 7 could if so desired be entered in one of the holes at each end thereof.

I claim:

1. A stud fastening comprising a head portion, a first pivot bearing in said head portion, a second pivot bearing in said head portion parallel with but spaced from said first pivot bearing, a base portion formed from a plurality of co-planar adjacent convolutions of a single length of wire, a stem consisting of the two ends of the wire forming said convolutions, and pivots for engagement in said pivot bearings constituted by inturned extremities of the stem.

2. A collar stud comprising a head portion, a first pivot bearing in said head portion, a second pivot bearing in said head portion substantially parallel with but spaced from said first pivot bearing, a base portion consisting of a single piece of wire bent into two substantially co-planar convolutions disposed adjacently to one another, a stem formed by the extension of the two ends of the wire constituting the base portion, two pivots produced by turning towards each other the extremities of the two wires constituting the stem, said pivots being for entry in said first and second pivot bearings, and a tail portion forming part of said head portion, the tail portion being shaped to fit between the two wires constituting the stem when the head of the stud is brought to the position for insertion in a stud hole.

HUGH ALEXANDER THOMSON.

REFERENCES CITED

The following references are of record in the file of this patent:

UNITED STATES PATENTS

| Number | Name | Date |
|---|---|---|
| 280,214 | Miller | June 26, 1883 |
| 370,489 | Mitchell | Sept. 27, 1887 |
| 641,565 | Wheeler | Jan. 16, 1900 |
| 1,026,153 | Degner | May 14, 1912 |